BACKWARD-WAVE AMPLIFIER

Filed June 13, 1955

MALCOLM R. CURRIE &
JOHN R. WHINNERY
INVENTORS

BY [signature]
ATTORNEYS

Oct. 4, 1960 M. R. CURRIE ET AL 2,955,226

BACKWARD-WAVE AMPLIFIER

Filed June 13, 1955 8 Sheets-Sheet 2

MALCOLM R. CURRIE &
JOHN R. WHINNERY
INVENTORS

BY [signature]
ATTORNEYS

MALCOLM R. CURRIE &
JOHN R. WHINNERY
INVENTOR.

BY Flehr & Swain
ATTORNEYS

MALCOLM R. CURRIE &
JOHN R. WHINNERY
INVENTORS

BY Flehr and Swain
ATTORNEYS

MALCOLM R. CURRIE &
JOHN R. WHINNERY
INVENTORS

BY [signature]
ATTORNEYS

MALCOLM R. CURRIE &
JOHN R. WHINNERY
INVENTOR.

BY [signature]

ATTORNEYS

MALCOLM R. CURRIE &
JOHN R. WHINNERY
INVENTORS

BY Flehr & Swain
ATTORNEYS

Oct. 4, 1960

M. R. CURRIE ET AL 2,955,226

BACKWARD-WAVE AMPLIFIER

Filed June 13, 1955

8 Sheets-Sheet 8

MALCOLM R. CURRIE &
JOHN R. WHINNERY
INVENTORS

BY Flehr & Swain
ATTORNEYS

United States Patent Office 2,955,226

Patented Oct. 4, 1960

2,955,226

BACKWARD-WAVE AMPLIFIER

Malcolm R. Currie, Beverly Hills, and John R. Whinnery, Orinda, Calif., assignors to The Regents of the University of California, Berkeley, Calif., a corporation of California Filed June 13, 1955, Ser. No. 514,843

21 Claims. (Cl. 315—3.6)

This invention relates generally to backward-wave amplifiers, and more particularly to a cascade backward-wave amplifier.

Traveling wave amplifiers and oscillators generally comprise a periodic (slow-wave) structure along which the electromagnetic wave to be amplified is propagated. The periodic structure may, for example, comprise a helical winding. In such structures the wave travels along the structure at the speed of light, but the phase velocity in the axial direction is dependent upon the configuration of the structure, and generally corresponds to the velocity of the electron beam.

An electron beam is projected along the periodic structure and adjacent thereto. There is coupling between the electron beam and the electromagnetic wave. Thus, there is continuous interaction between the wave traveling along the helix and the electron beam. As a result of the interaction, energy is transferred from the electron beam to the electromagnetic wave thereby amplifying the wave. This is analogous to a breeze blowing over water, thereby creating and increasing the amplitude of waves.

Two types of prior art traveling wave apparatus exist. In one the electromagnetic wave is introduced at the electron gun end of the periodic structure and the amplified wave is extracted at the collector end. Because of the periodicity of the structure a periodic axial field is set up by the electromagnetic wave. Due to this periodic field, certain of the electrons traveling in the electron beam are slowed down while others are speeded up. If the speeding up and slowing down of the electrons were exactly equal, no amplification could result. It turns out however that the two quantities are not exactly equal. There is bunching around the slow moving electrons, thus reducing the mean velocity and hence the kinetic energy of the beam as a whole. This increment of kinetic energy is transferred to the traveling electromagnetic wave and results in the wave being amplified. In this type of tube the phase velocity and energy transfer are in the same direction as the motion of the electron beam.

The second type of traveling wave device is sometimes referred to as backward-wave amplifier or oscillator. In this device the electromagnetic wave is introduced at the collector end and the amplified signal is removed at the gun end. Thus it is seen that this type of circuit supports a backward wave. Here again the wave is characterized by a phase velocity which is in the direction of current flow. The direction of energy transfer (group velocity) is in an opposite sense. Since it possesses a phase velocity which is in a direction of electron current and which is approximately synchronized with the beam velocity, a portion of the kinetic energy of the electrons will be converted to wave energy by an interaction process which is identical with that described above.

The principal difference between the two types of circuits is not a fundamental difference in electronic interaction, but is a difference in the direction of energy flow. The backward wave device is inherently regenerative in the sense that the energy flow loop is established by oppositely directed movements of energy in the wave circuit and on the beam. In this device, if there is sufficient coupling between the electron beam and the circuit wave, the bunching induced on the beam can become large enough to produce the initial field causing the bunching; under these conditions the amplifier becomes an oscillator. A backward-wave device behaves as a narrow band regenerative amplifier whose center frequency can be smoothly tuned over a wide range by varying the beam voltage. As an oscillator, the tube is likewise electronically tunable over a 2 or 3 to 1 range in frequency with the conditions for regeneration automatically produced by the feedback nature of the electronic interaction.

Backward-wave amplifiers have several serious disadvantages. When reasonably high gains are required, the beam current must be near the values where oscillations start. Thus, when operating at high gains, stable operation is difficult. If the couplings into and out of the helix are imperfect, the internal reflections may cause the value of the current to fluctuate periodically about a smooth curve as the frequency changes. This causes sharp gain fluctuations or even excursions into the oscillation region of the amplifier. A further disadvantage of this type of amplifier is that there is a direct feedthrough path between the input signal and the output signal.

It is a general object of the present invention to provide an improved backward-wave apparatus.

It is another object of this invention to provide backward apparatus which is inherently stable in operation.

It is a further object of the present invention to provide backward-wave apparatus which gives relatively high gain with operating currents which are substantially below the start oscillation current.

It is a further object of this invention to provide backward-wave apparatus in which the off-signal rejection is high.

It is still a further object of the present invention to provide a traveling wave apparatus in which the bandwidth may be controlled.

It is still a further object of this invention to provide backward-wave apparatus in which the operating characteristics can be made to vary smoothly with frequency, and which may be designed for almost constant gain over a large frequency range.

These and other objects of the invention will appear more clearly from the following description taken in conjunction with the accompanying drawings.

Referring to the drawings.

Figure 4:
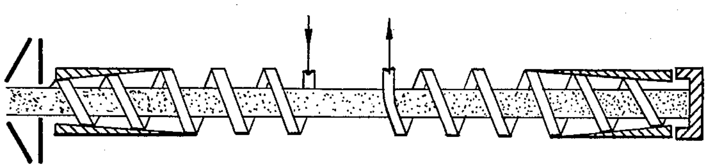
Figure 5:
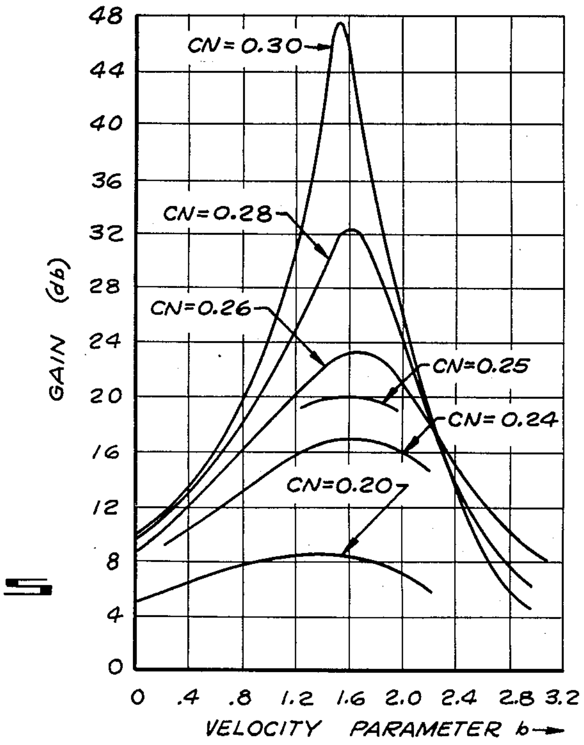
Figure 6:
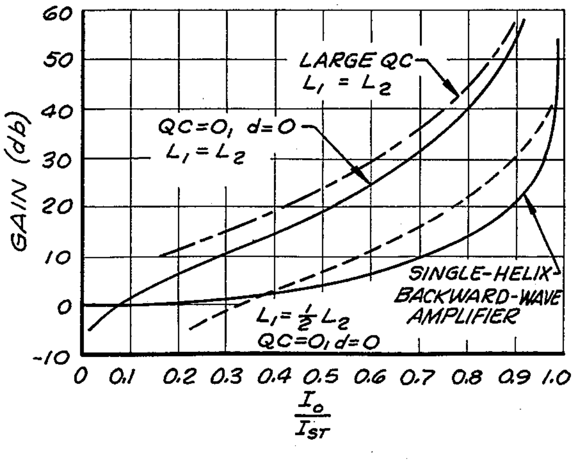
Figure 7:
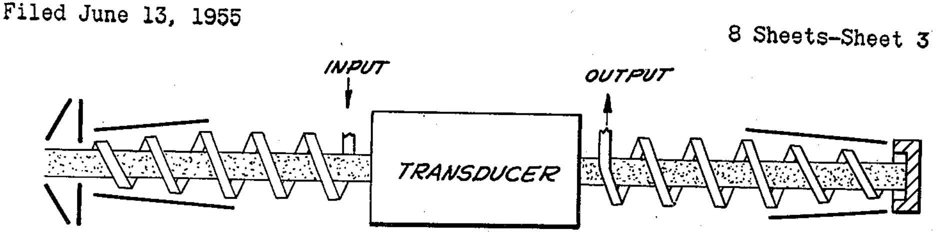
Figure 8:
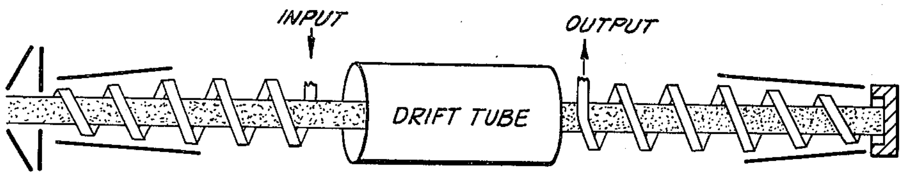
Figure 9:
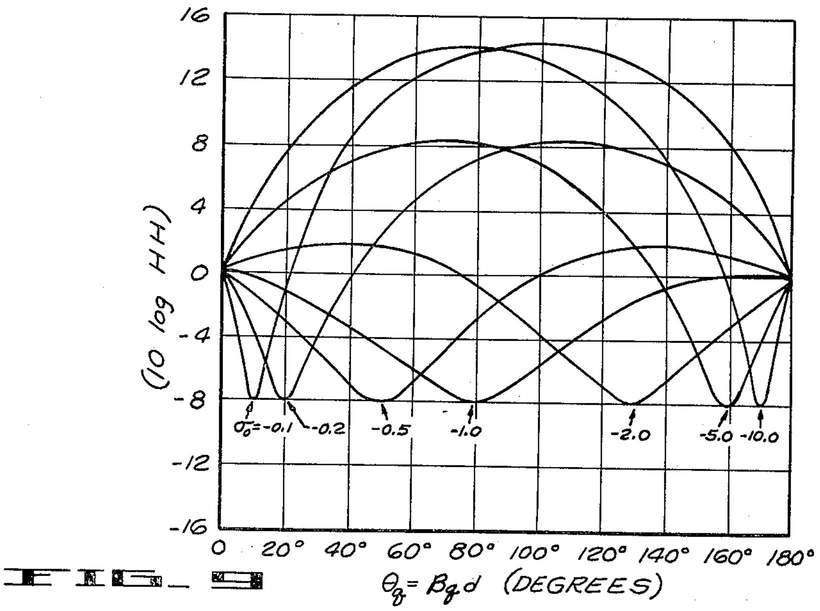
Figure 10:
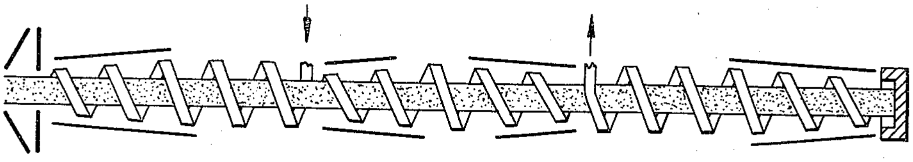
Figures 11, 12:
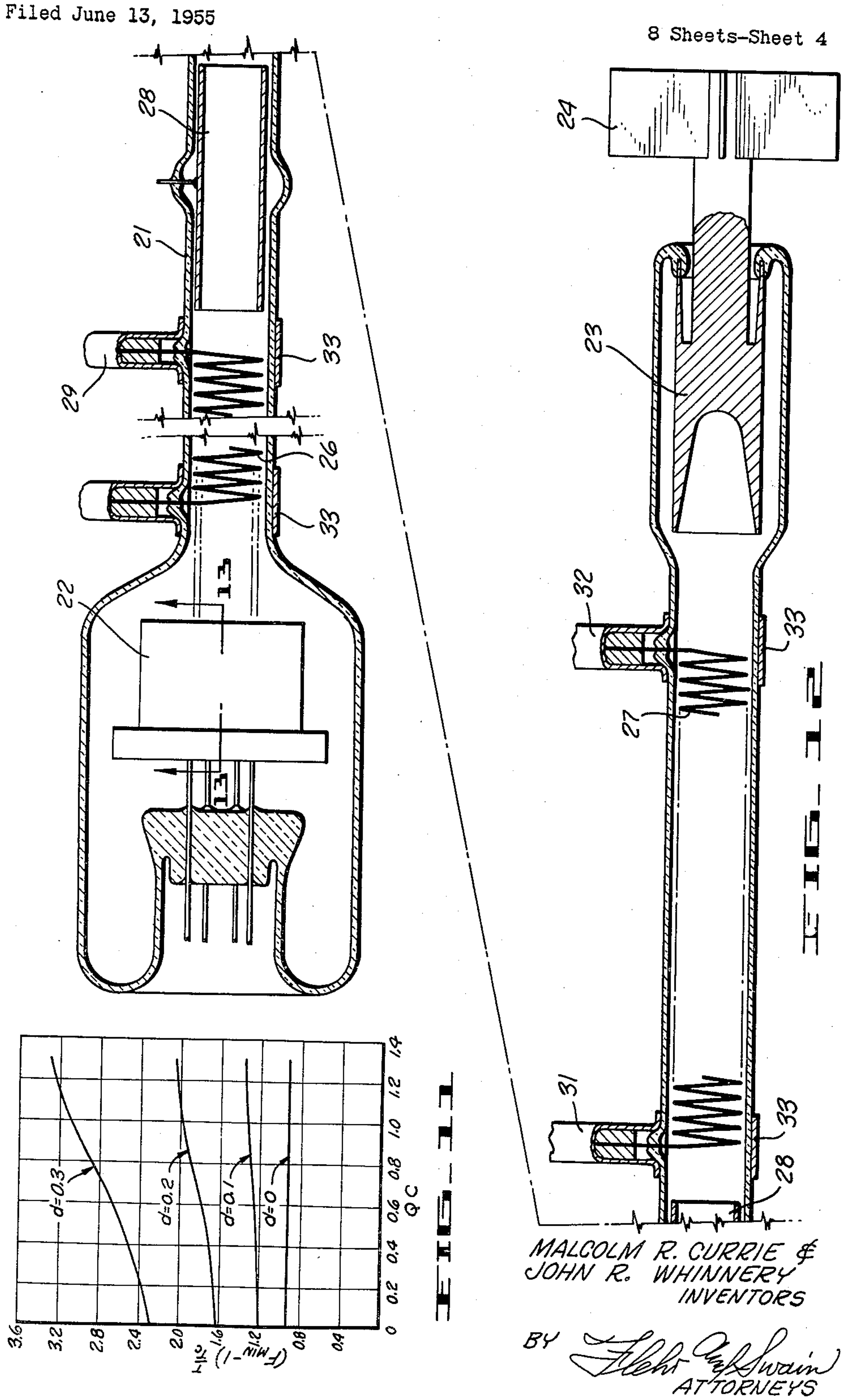
Figure 13:
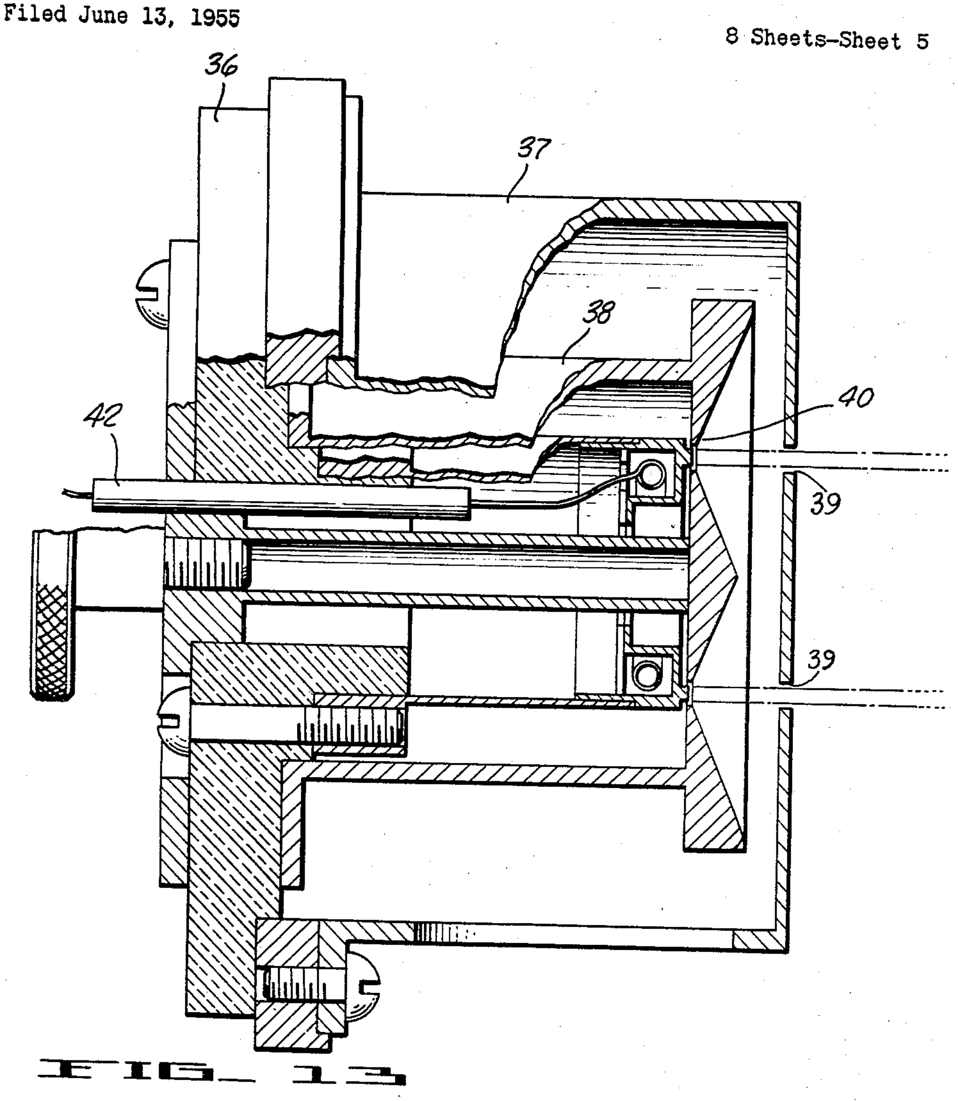
Figure 14:
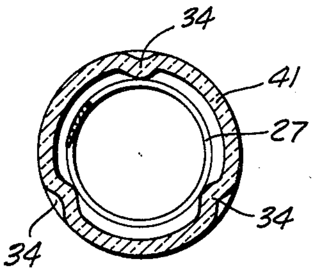
Figure 15:
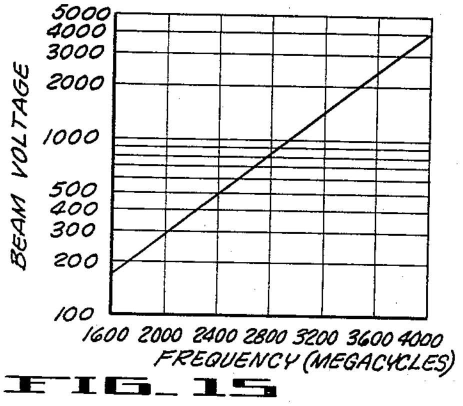
Figure 16:
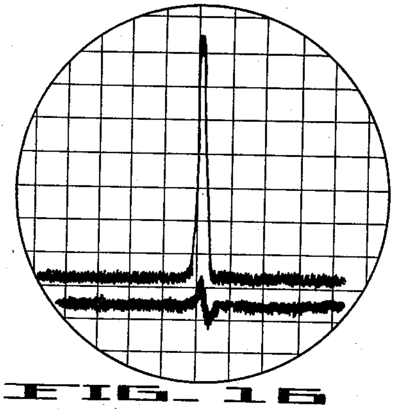
Figure 17:
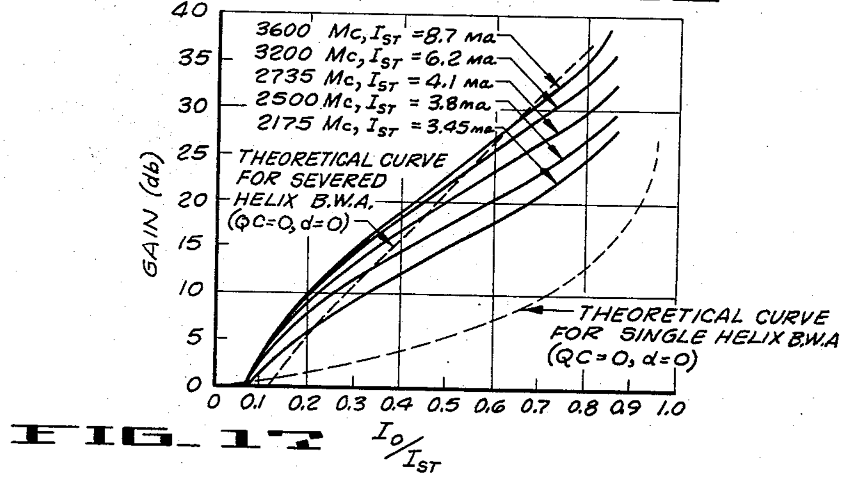
Figure 18:
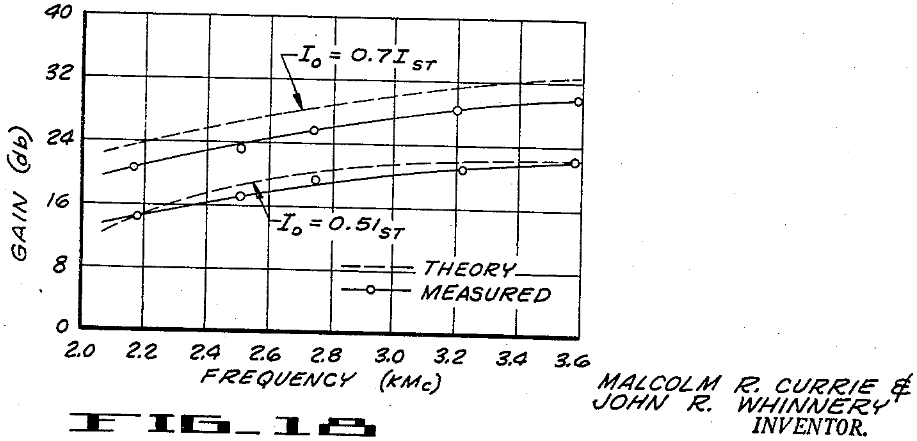
Figure 19:
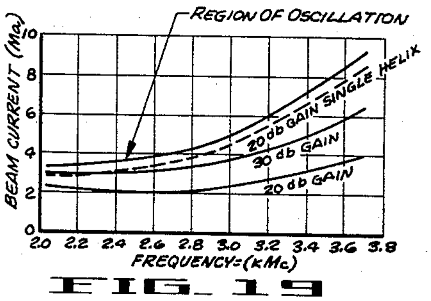
Figure 20:
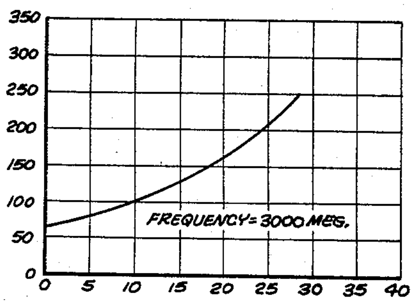
Figure 21:
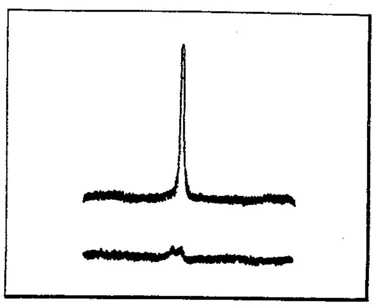
Figure 22:
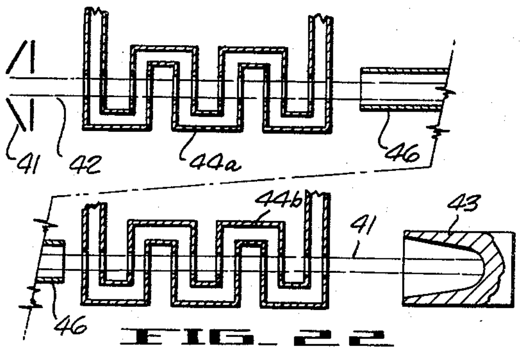
Figure 23:
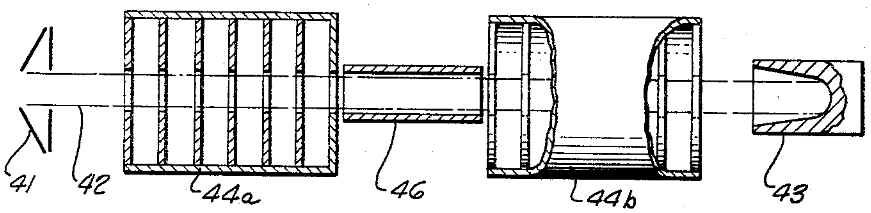
Figure 24:
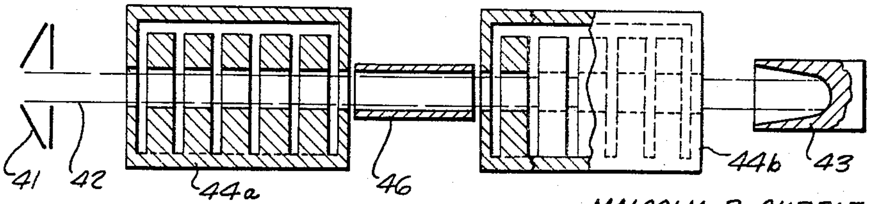

which describes the modulation on a beam at the output end of a backward-wave circuit;

Figure 4 is a schematic model of a cascade backward-wave amplifier;

Figure 5 shows the gain of a cascade backward-wave amplifier as a function of the velocity parameter;

Figure 6 shows the gain of a cascade backward-wave amplifier as a function of current;

Figure 7 is a schematic model of a cascade backward-wave amplifier in which the modulator and demodulator sections are separated by an arbitrary structure;

Figure 8 is a schematic model of a cascade backward-wave amplifier in which the modulator and demodulator sections are separated by a drift tube;

Figure 9 shows the effect of the drift region on the gain of the cascade backward-wave amplifier;

Figure 10 is a schematic model of a cascade backward-wave amplifier in which the modulator and demodulator sections are separated by a floating helix;

Figure 11 shows the minimum noise figure of a cascade backward-wave amplifier;

Figure 12 is a side elevational view partly in section of a cascade backward-wave amplifier;

Figure 13 is a cross-sectional view showing the electron gun employed in the cascade backward-wave amplifier of Figure 12;

Figure 14 is a sectional view taken along the lines 14—14 of Figure 12;

Figure 15 shows a tuning curve for a backward-wave cascade amplifier;

Figure 16 shows oscilloscope traces of output power as a cascade backward-wave amplifier is swept in voltage;

Figure 17 shows curves of gain as a function of normalized current at different frequencies;

Figure 18 is a comparison of measured and theoretical gain as a function of frequency for an experimental cascade backward-wave amplifier;

Figure 19 shows curves of the beam current necessary to maintain constant gain;

Figure 20 is a curve of voltage gain times bandwidth for a cascade backward-wave amplifier;

Figure 21 shows the effect of stagger tuning on the bandwidth of a typical cascade amplifier;

Figure 22 shows a schematic view of a cascade amplifier which employs a zigzag waveguide periodic structure;

Figure 23 shows a schematic view of another cascade backward-wave amplifier which employs a loaded waveguide periodic structure; and Figure 24 shows another cascade backward-wave amplifier in which the periodic structure comprises a ridged waveguide with traverse slots.

Figure 25:
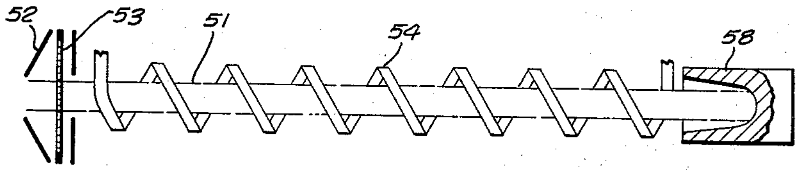
Figure 26:
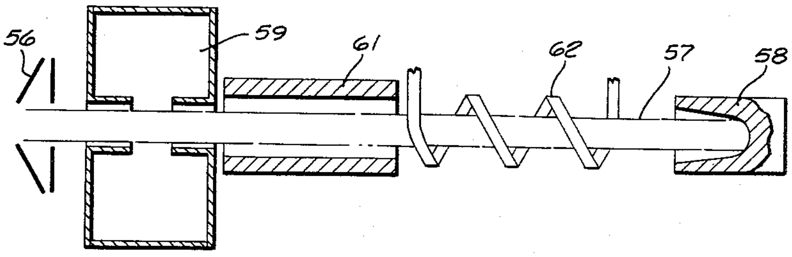
Figure 27:
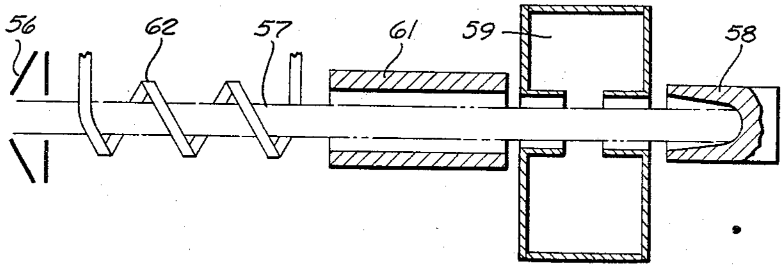

Figure 25 shows a schematic view of a backward-wave amplifier which employs a grid for modulation and a periodic structure for demodulation;

Figure 26 shows a schematic view of a backward-wave amplifier which employs a cavity for modulation and a periodic structure for demodulation; and Figure 27 shows a schematic view of a backward-wave amplifier which employs a periodic structure for modulation and a cavity for demodulation.

Figure 1:
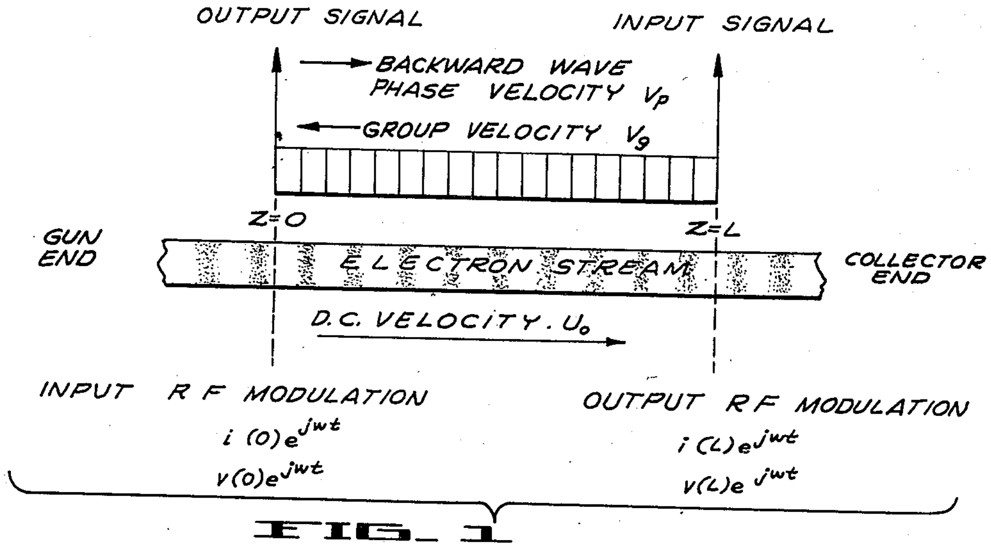
Figure 1 is a schematic model of a backward-wave circuit.

In order to more fully understand backward-wave interaction, the model shown in Figure 1 will be analyzed. A transmission-line approach is used, the equations of motion and continuity are linearized (small signal), and motion only in the $z$ direction is allowed. The beam is assumed to possess an arbitrary initial current and velocity modulation (bunching) as it enters the circuit at $z=0$. Time dependents of the radio frequency quantities is assumed to be of $\exp(j\omega t)$.

The relation between R.-F. convection currents $i(z)$ on the electron beam and the longitudinal (axial) field on the slow wave circuit $E(z)$ is:

$$\frac{d^2 i(z)}{dz^2}+2j\beta_e\frac{di(z)}{dz}+(\beta_q^2-\beta_e^2)i(z)=\frac{-2j\beta_e C^3}{K}E(z) \quad (1)$$

Similarly, the modified telegrapher's equation, giving coupling between the circuit and beam, is:

$$\frac{d^2 E(z)}{dz^2}-\Gamma_0^2 E(z)=-\Gamma_0 K\frac{d^2 i(z)}{dz^2} \quad (2)$$

where:

$\beta_e$=the electron beam wave number,
$\beta_q$=the effective plasma frequency wave number,
$K$=the impedance presented by the circuit to the beam,
$C$=gain parameter,
$\Gamma_0$=the propagation constant.

In the absence of the electron beam the circuit wave propagates as $\exp(j\omega t-\Gamma_0 z)$.

A solution for the composite beam circuit model involves the simultaneous solution of the above equations. $E(z)$ and $i(z)$ are then solutions of fourth-order linear differential equations. The associated constants in the solutions are fixed by four independent boundary conditions. Two of these conditions pertain to the beam and two to the circuit. The current and velocity modulation can be independently specified at $z=0$ and the applied circuit field at $z=L$ is known. The remaining constraints can be taken as a matched circuit termination at one end. The solutions can be expanded in terms of exponentials (i.e., four waves).

Employing methods described in "Traveling-Wave Tubes" by Pierce, published in 1950 by D. Van Nostrand Co., $E(z)$ and $i(z)$ can be expressed as the sum of partial waves. Assuming linearized definition of R.-F. currents, conservation of charge, that the phase velocities of the perturbed waves are close to the D.-C. beam velocities, and that the circuit is matched at one end, the complete solutions for the "output" quantities can be written:

$$E(o)=\frac{\mathscr{D}}{\Delta}E(L)-\frac{2V_0\beta_e C^2}{I_0}\frac{\Phi}{\Delta}i(o)+j\frac{u_0\beta_e C}{\eta}\frac{\chi}{\Delta}v(o) \quad (3)$$

$$i(L)=j\frac{I_0}{2V_0\beta_e C^2}\frac{\chi}{\Delta}E(L)-\frac{\Lambda}{\Delta}i(o)-j\frac{I_0}{u_0 C}\frac{\Psi}{\Delta}v(o) \quad (4)$$

$$v(L)=-\frac{\eta}{u_0\beta_e C}\frac{\Phi}{\Delta}E(L)+j\frac{u_0 C}{I_0}\frac{\Omega}{\Delta}i(o)-\frac{\Lambda}{\Delta}v(o) \quad (5)$$

The coefficients are functions of the D.-C. conditions of the beam, velocity $b$, circuit loss $d$, space-charge QC and circuit length. The following functions are defined:

$$\mathscr{D}=(\delta_1-\delta_2)(\delta_2-\delta_3)(\delta_3-\delta_1)$$

$$\chi=\sum_{i=1}^{3}(\delta_j-\delta_k)e^{2\pi CN\delta_i}$$

$$\Phi=\sum_{i=1}^{3}\delta_i(\delta_j-\delta_k)e^{2\pi CN\delta_i}$$

$$\Delta=\sum_{i=1}^{3}(\delta_i^2+4QC)(\delta_j-\delta_k)e^{2\pi CN\delta_i}$$

$$\Psi=e^{-j2\pi N}\sum_{i=1}^{3}(\delta_j^2-\delta_k^2)e^{2\pi CN(\delta_j+\delta_k}$$

$$\Lambda=e^{-j2\pi N}\sum_{i=1}^{3}\delta_i(\delta_j^2-\delta_k^2)e^{2\pi CN(\delta_j+\delta_k)}$$

$$\Omega=e^{-j2\pi N}\sum_{i=1}^{3}\delta_i^2(\delta_j^2-\delta_k^2)e^{2\pi CN(\delta_j+\delta_k)}$$

where:

$i, j, k$ are taken as cyclic permutations of 1, 2, 3,
$N$=number of electronic wavelengths in circuit length L,
$QC$=the space charge, parameter,
$b$=beam velocity,
$d$=circuit loss,
$\sigma_0$=D.-C. linear charge density,
$\delta_n$=incremental propagation constant,
$u_0$=D.-C. velocity,
$I_0$=input beam current,
$V_0$=input field, D.-C. beam potential.

The linear relationships, Equations 3 through 5, express the output quantities in terms of velocity, current and field which are impressed on the system. The coefficients consist of a general matrix for applications in the succeeding calculations.

The backward-wave amplifier previously described has a smooth beam injected from the electron gun directly into the interaction space. No R.-F. or velocity modulation exists on the beam at the gun end of the circuit. As a result of the interaction process, the circuit field builds up from its initial impressed value at $z=L$ to a maximum value at $z=0$, thus being amplified. The modulation (bunching) induced on the beam increases in magnitude in the direction of the electron flow, thus giving the greatest bunching at the collector end of the stream. When the feedback within the circuit is sufficient, the amplifier goes into oscillation.

The power associated with the circuit is:

$$P(z)=\frac{1}{2\beta_e^2K}E(z)E(z)^* \qquad (6)$$

and the power gain can be written as:

$$G=\frac{P(o)}{P(L)}=\left|\frac{\mathscr{D}}{\Delta}\right|^2 \qquad (7)$$

For a fixed amount of space charge (QC) and circuit loss ($d$), it is possible to adjust the beam velocity ($b$) and the electrical length of the circuit (CN) so that the denominator in the above expression vanishes. This condition of infinite small-signal gain is unstable and is taken as the point at which the amplifier becomes an oscillator.

An amplifier of this type is capable of yielding very high values of gain. Because of the regenerative action, the tube characteristically possesses a very sharp frequency response. The limitations of this amplifier have been previously described. Briefly they depend upon the lack of separation between the input and output circuits and the fact that the amplifier must be operated near the oscillation region to obtain maximum gain.

Analyzing the same circuit but paying particular attention to the modulation (bunching) on the beam, the following equations may be derived from Equations 4 and 5 for the R.-F. current and velocity modulation which is induced upon the beam as a result of the interaction process.

$$i(z)=j\frac{I_0}{2V_0\beta_eC^2}\,\frac{\chi(z/LCN)}{\Delta(CN)}E_{\text{in}} \qquad (8)$$

$$v(z)=\frac{-\eta}{u_0\beta_eC}\,\frac{\Phi(z/LCN)}{\Delta(CN)}E_{\text{in}} \qquad (9)$$

Figure 2:
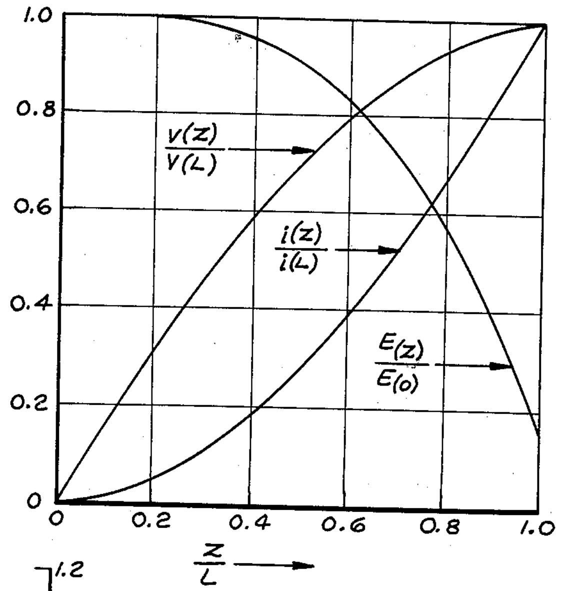
Figure 2 shows the build-up of current modulation and circuit field as a function of distance in a backward-wave circuit.

Referring particularly to Figure 2, the R.-F. current and field are shown as functions of distance for the special case of zero space charge and circuit loss. The curves are for a current of about 87 percent of the starting value and for a value of beam velocity ($b$) which optimizes the gain of the device as an amplifier. The curves emphasize the fact that where the current modulation is weak, the circuit field is strong and vice versa. This is inherent in the nature of the interaction and differs markedly from the forward wave interaction.

It is of interest to examine the nature of the modulation just as it leaves the interaction space. A descriptive parameter is the dimensionless ratio $$\sigma(z)=\frac{Ci(z)}{\rho_0v(z)}\,\frac{j\chi(z/LCN)}{\Phi(z/LCN)} \qquad (10)$$

Figure 3:
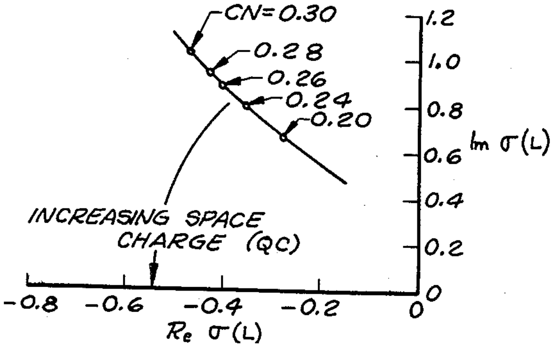
Figure 3 shows the parameter $$\sigma(L)=\frac{Ci(L)}{\rho_0 v_{(L)}}$$

$\sigma(L)$ is shown in Figure 3 as a function of length of circuit (CN) for space charge (QC) equal zero, circuit loss ($d$) equal zero, and optimum beam velocity ($b$). As the effective length CN of the interaction space increases the magnitude of $\sigma(L)$ also increases. The current modulation leads the velocity modulation (in the time sense) by an angle greater than 100 degrees indicating that there is power carried by the electron beam. This is in contrast to a klystron in which the angle is 90 degrees and no R.-F. power is carried by the beam. For the limiting case of large QC, $$\sigma(L)\rightarrow-\frac{1}{b} \qquad (11)$$

where, in this case $$b\cong\sqrt{4QC} \qquad (12)$$

Therefore, increased current density causes the phase angle between current and velocity modulation at the end of the interaction space to increase and $|\sigma(L)|$ to decrease.

Referring again to the curve of Figure 2, it is seen that where current modulation is weak the field is strong. This is inherent in the nature of the interaction and differs considerably from the case of the forward wave amplifier. This suggests that backward-wave interaction is a relatively inefficient process.

It is desirable to secure stronger reciprocal action between the beam and circuit. We have found that a stronger reciprocal action may be obtained by placing initial modulation on the beam so that the interaction can commence with relatively large R.-F. energy associated with both the electron beam and the circuit (wave).

Referring again to Figure 1, consider the case in which the beam is injected into the interaction space with both velocity and current modulations whose magnitudes and relative phases are arbitrary. Assume further that the collector end of the circuit is passively terminated in a matched load. Let us now consider the circuit field which is induced on the helix, in particular its value at the output terminals. From Equations 3 and 10

$$E(o)=-\frac{2V_0\beta_eC}{I_0}\,\frac{\rho_0v_{\text{in}}}{\Delta}[\sigma_{\text{in}}\Phi+j\chi] \qquad (13)$$

where $v_{\text{in}}$ and $\sigma_{\text{in}}$ describe the input modulation.

Since the induced field is strongly dependent upon the parameter $\sigma_{\text{in}}$ and hence on the nature of the system employed in the original modulation of the beam, we shall examine several specific cases. First let us compare the backward-wave circuit with the output cavity of a klystron amplifier. In a simple klystron amplifier, the cavity is located at a point of maximum current modulation along the beam. The bunched electrons then induce a current flow in the cavity walls and excite it to resonance. An equivalent shunt resistance of the cavity can be defined which relates the power delivered to the resonator to the fundamental convection current component in the beam, $$R_{sh}=\frac{2P}{i^2} \qquad (14)$$

A figure of merit for the cavity is usually taken as the ratio $$\frac{R_{sh}}{Q}\sim\text{gain}\times\text{bandwidth} \qquad (15)$$

An upper limit for this ratio is roughly 100 with $R_{sh}$ approximately equal to 100,000 and Q approximately equal to 1000. $R_{sh}$ can be increased at the expense of bandwidth, and vice versa.

Now let us consider the situation in which the klystron cavity is replaced by a backward-wave structure. The two arrangements are similar in several important respects. Both devices are narrow-band; both absorb energy from a bunched beam. The systems are on one hand resonant and on the other hand strongly regenerative in nature. For contrast it is of interest to define an effective shunt resistance for the backward-wave circuit for the case of pure current modulation at its input and to compare the resulting figure with that obtainable from a klystron cavity. From Equations 6 and 13 the following expression is obtained:

$$(R_{sh})_{eff.}=\left(\frac{V_0}{2I_0}\right)^{2/3}K^{1/3}\frac{\Phi\Phi^*}{\Delta\Delta^*} \quad (16)$$

Substitution of some conservative parameters ($V_0\sim500$ volts, $I_0\sim3$ ma., $K\sim5$ ohms, $I_0=0.7I_{st}$) into the above relation indicates that an effective shunt impedance of $10^5$ ohms can easily be obtained in practice. It will be presently shown that the corresponding Q in this region of operation is typically of the order of 400. As in the case of a klystron $(R_{sh})_{eff.}$ can be increased at the expense of bandwidth. A length of backward-wave circuit therefore represents a conceptual improvement over a re-entrant-type resonator on the basis of their relative figures of merit. This is not surprising when the cumulative nature of the distributed interaction is considered; however, it does illustrate the effectiveness of a backward-wave demodulator (de-buncher) in extracting energy from a bunched beam.

From these considerations it is seen, in principle, an amplifier can be constructed which utilizes a re-entrant cavity to modulate the beam and a periodic circuit as the output structure. Such an amplifier is entirely feasible and would appear to possess some advantages.

The denominator in the expression for the field at the output of the demodulator is exactly the same as that which appears in the gain expression for a simple backward-wave amplifier. This implies that for identical circuits, the condition of instability (i.e., start-oscillation) occurs at the same point and is independent of externally applied fields.

Referring particularly to Figure 4, we have shown a novel cascade backward-wave amplifier. The amplifier comprises generally an electron gun which projects a beam of electrons to a collector. Two periodic structures are located adjacent the beam whereby a wave traveling along the structures interacts with the electron stream. The structures shown are helices, but it is to be understood that the structures may comprise any periodic structure (slow-wave structure) capable of propagating a wave having a slow axial velocity. The input signal is introduced at the collector end of the periodic structure nearest the electron gun and serves to modulate (bunch) the electron beam. The modulated electron beam then interacts with the second periodic structure which acts as a demodulator, although the electrons may have a greater modulation when they leave the section than when they enter the section. The output signal is removed at the gun end of the second periodic structure.

Assuming that the two helices are completely isolated one from the other, and that no coupling between them exists in the absence of the electron stream, the power output of the second helix is given by the expression $$P_{out}=\frac{1}{(2K)^{1/3}}\left(\frac{V_0}{I_0}\right)^{4/3}|\rho_0(v_{in})_2|^2\frac{|(\sigma_{in})_2\Phi_2+j\chi_2|}{|\Delta_2|^2} \quad (17)$$

where the added subscripts (2) denote quantities pertaining to the second helix and $(\sigma_{in})_2$ describes the beam modulation at its entrance. From Equation 9 the velocity modulation at the output of the first helix is given by $$|\rho_0(v_{out})_1|^2=(2K)^{1/3}\left(\frac{I_0}{V_0}\right)^{4/3}\left|\frac{\Phi_1}{\Delta_1}\right|^2P_{in} \quad (18)$$

and, in this case, with no separation between circuits and no velocity jump, the continuity of velocity and current is expressed by $$(\sigma_{out})_1=(\sigma_{in})_2,\ (\rho_0v_{uot})_1=(\rho_0v_{in})_2 \quad (19)$$

The gain expression for the severed-circuit amplifier becomes $$G=\left|\frac{\chi_1\Phi_2+\chi_2\Phi_1}{\Delta_1\Delta_2}\right|^2 \quad (20)$$

The simplest case results when both helices are the same physical length (it has been implicitly assumed that they are identical in all other respects). This is also the case of greatest interest. For operation at a specified fraction of starting current, maximum gain will be obtained for equal circuit lengths. In this case the over-all gain is given by $$G=\left|\frac{2\Phi\chi}{\Delta^2}\right|^2 \quad (21)$$

Referring to Figure 5, gain is shown as a function of the velocity parameter of $b$ for $QC=0$, $d=0$. The curves are plotted for various lengths (CN) of the circuits. For CN greater than about 0.24 ($I_0>0.5\ I_{st}$) the magnitude of $b$ at maximum gain is fairly constant. Maximum gain therefore occurs at approximately constant percentage deviation of the beam velocity from that of the unforced circuit wave regardless of the gain level. The curves also display a lack of symmetry around the point of maximum gain which has been experimentally observed.

Since there is a one-to-one correspondence between velocity and frequency, Figure 5 illustrates the reciprocal relation between gain and bandwidth. From the definition of $b$ $$\Delta b\cong\frac{1}{C}\frac{\Delta v_p}{v_p}\sim\frac{1}{C}\frac{\Delta f}{f} \quad (22)$$

so that the velocity width $\Delta b$ is proportional to the bandwidth. For a tape helix the phase velocity of the dominant backward-wave harmonic is $$v_p\cong\frac{ka\sqrt{\mu\epsilon}\tan\psi}{D-ka} \quad (23)$$

where:

$\psi$=pitch angle of the helix,
$ka$=ratio of circumference to free-space wavelength,
$D$=dielectric loading factor.

Therefore $$\Delta b\cong\frac{D}{ka}\frac{\Delta(ka)}{(D-ka)} \quad (24)$$

and the bandwidth becomes $$\Delta f\cong Cf\left(1-\frac{ka}{D}\right)\Delta b \quad (25)$$

where $\Delta b$ is interpreted as the spread of the gain curves at the half-power points.

An equivalent Q of the amplifier can be defined $$Q=\frac{f}{\Delta f}\cong\frac{1}{C\left(1-\frac{ka}{D}\right)\Delta b} \quad (26)$$

For example, at $ka=0.5$, $I_0=0.7I_{st}$, $C=0.01$ and $D=1$ an equivalent Q of approximately 400 will be realized. A higher Q at a given gain level can be obtained by decreasing the beam-helix coupling and going to longer lengths of helix (at the same CN). Alternately, operation at higher beam voltages, lower currents, and the use of more dispersive backward-wave circuits could be employed.

For the case of large space charge (QC), the circuit field at the output of the demodulator section can be written $$E_{out}\cong\frac{\beta_eK}{2C^2}(\rho_0v_{in})_2\sqrt{\frac{2}{b}}\tan\left[\frac{\pi}{2}\frac{CN}{CN}\right] \quad (27)$$

The over-all gain then becomes approximately $$G\cong\tan^4\left[\frac{\pi}{2}\left(\frac{I_0}{I_{st}}\right)^{1/4}\right] \quad (28)$$

Referring particularly to Figure 6, the gain of the severed-helix amplifier, optimized with respect to $b$, is shown as a function of current for the limiting cases of large and small space charge (zero loss). The curves are universal. That is, the starting current $I_{st}$ can be separately calculated as a function of frequency in any specific case. The rapid rise of the curves from the region of negative gain indicates the strong interaction which occurs in the demodulator. A curve for $L_1=\frac{1}{2}L_2$ illustrates the desirability of using circuits of equal length.

A comparison of the characteristics of the idealized severed-helix tube with those of the simple backward-wave tube have previously been given. A typical calculation ($I_0=0.7I_{st}$, $QC=0$, $d=0$) shows that where the latter device produces a gain of 11 db, the "gain" of the modulator-demodulator configuration is approximately 32 db. In order to put the comparison on a fairer basis, it should be recognized that the composite system which includes two circuits each have an electrical length equal to that of the single circuit in the conventional backward-wave tube. It might be more realistic to compare the gain of the composite structure with the gain obtained when two single circuits are cascaded. A comparison on this basis shows that the former arrangement still offers higher gain, 32 db, as compared to 22 db.

The physical explanation of this behavior has already been given. As explained, in the usual case an unmodulated beam enters the interaction space where the circuit wave is strongest; conditions for strong interaction are not optimum. In our arrangement the modulation induced during the beam transit through the first circuit is immediately placed in the region of maximum field on the second circuit. An enhanced reciprocal interaction between the beam and the circuit results, thus leading to the improved results observed.

The idealized model of the severed helix could not be realized very closely in practice. Two circuits placed immediately adjacent each other would prohibit good input and output matching and their fringing fields would not yield the high degree of isolation which is desired. In a more practical model the circuits are separated by an arbitrary structure. A general configuration of this type is shown in Figure 7. This structure again includes first and second periodic structures which act as modulator-demodulator sections coupled to an electron beam. A transducer is inserted between the two sections and serves not only to isolate the input and output circuits, but also to transform the velocity and current modulation which exists on the beam at the end of the first section so as to optimize its output signal. In the general case, the transducer can consist of any combination of propagating or non-propagating circuits.

The simplest transducer section can be of the type shown in Figure 8 which consists merely of a drift tube. This constitutes an analogy with the klystron, although the drift tube here is not essential to the bunching mechanism. The effect of the drift tube on the over-all gain can be simply determined under the assumption that only one mode is excited in this region by the input modulation (denoted $i_a$ and $v_a$). In this case the transformation to new values $i_b$ and $v_b$ can be described in terms of the space-charge waves of a single mode; the drift region can be regarded as a passive and lossless two-terminal pair network. The validity of the above assumption depends upon the particular geometry of the structure. For a helix circuit and a hollow beam, such an analysis can be verified experimentally.

The output modulation is related to the input modulation by the following equations $$i_b=i_a\left[\cos\theta_q-j\frac{\sigma_0}{\sigma_a}\sin\theta_q\right] \qquad (29)$$

$$\rho_0 v_b=\rho_0 v_a\left[\cos\theta_q-j\frac{\sigma_a}{\sigma_0}\sin\theta_q\right] \qquad (30)$$

where $$\theta_q=\frac{\omega_p}{u_0}Rd \text{ (radian length of drift tube)} \qquad (31)$$

$$\sigma_a=\frac{Ci_a}{\rho_0 v_a} \qquad (32)$$

$$\sigma_0=-\left(\frac{C}{R}\frac{\omega}{\omega_p}\right) \qquad (33)$$

The particular beam and drift-region configuration is accounted for by the plasma frequency reduction factor R. This parameter may be evaluated for a particular beam configuration possessing modulation characteristics of the backward-wave on the helix. If $\sigma_0$ is regarded as the "characteristic impedance" of the drift region, $i_a$, $v_a$ and $\sigma_a$ transform exactly as voltage, current and impedance along a transmission line; the usual calculation techniques (e.g., Smith chart) can be applied.

In the simple case of identical input and output circuits, the over-all gain is given by $$G=\left|\frac{2\Phi\chi}{\Delta^2}\right|^2 HH^* \qquad (34)$$

where $$H=\cos\theta_q-j\frac{\sin\theta_q}{2}\left(\frac{\sigma_a}{\sigma_0}+\frac{\sigma_0}{\sigma_a}\right) \qquad (35)$$

The first factor in Equation 36 is the gain of the idealized severed-helix tubes; the factor HH* represents the effect of the drift region on the over-all gain of the device. Referring particularly to Figure 9, some representative curves of HH* (expressed in db) are given as a function of drift tube length for various $\sigma_0$. Although these curves are for operation at 70 percent of starting current, it is found that they do not change significantly with the ratio $I_0/I_{st}$. It is apparent that a drift tube can increase the over-all gain for magnitudes of $\sigma_0$ either much greater or much smaller than unity. The former condition can only be met at the higher frequencies (e.g., X-band and with the beam grazing the drift tube so as to lower the value of R.

For typical operation of a helix-type backward-wave tube of S-band, $\sigma_0$ may have a value near $-1$. In this range nearly all drift lengths result in a subtraction from the net gain. However, the magnitude of gain is often only of secondary importance in such a tube. For example, in the application of the tube as a swept amplifier, it may be more important to maintain reasonably constant gain as a function of frequency at a constant value of beam current. The gain of the severed-helix tube (at small QC) is a function only of normalized current ($I_0/I_{st}$). Since $I_{st}$ generally increases with frequency, the gain at constant current will decrease at higher frequencies. The choice of drift distance therefore lends an additional degree of freedom to the design of the tube. In particular, referring to Figure 9, it is seen that this region can be made to compensate for the above effect and the over-all gain can be made constant with frequency. This compensating action was observed in an experimental amplifier to be presently described. In this sense, the drift region can be regarded as a gain equalizer.

In Figure 10 we have shown another simple transducer section 11 terminated at each end in lossy match 12 and 13. By analogy to the floating cavity klystron, this configuration is termed the floating helix amplifier. In the limit, this configuration may consist of an arbitrary number of floating circuits between the modulator and de-modulator with each contributing to the over-all gain of the tube. The bandwidth can be adjusted to some degree by stagger tuning these elements.

For the case in which the floating circuit is identical to the input and output circuits, the over-all gain is given by $$G=\left|\frac{2\Phi\chi}{\Delta^2}\right|^2 JJ^* \qquad (36)$$

where $$J=\frac{1}{\Delta}\left[-\Lambda+\frac{1}{2}\left(\frac{\Phi^2\Psi+\chi^2\Omega}{\Phi\chi}\right)\right] \qquad (37)$$

The factor JJ* expresses the contribution of the floating circuit to the gain of the idealized model. Numerical calculations for small QC show that at $I_0/I_{st}=0.5$ the gain is increased by about 9 db and, at $I_0/I_{st}=0.7$, the new element adds about 19 db. Calculations for unequal circuit lengths or multiple floating circuits can be readily formulated in matrix notation based on the linear relationships 3, 4 and 5.

In considering the application of the cascade backward-wave amplifier as a small-signal device, it is important to know the noise figure, i.e., its capability of detecting extremely low signals. The minimum detectable signal is limited by random fluctuations of the electrons and the conversion of these fluctuations to noise power on the circuit at the tube's output. A theoretical minimum noise figure for conventional traveling-wave tubes has been calculated recently. In Figure 11, the minimum noise figure has been computed for various values of circuit loss $d$ as a function of space charge QC. Certain features of the curves are worth comment. For zero loss the minimum noise figure is exactly the same as for a conventional forward-wave amplifier, namely $$F=1+(0.9265)\frac{T_c}{T}\sim 6 \text{ db} \qquad (38)$$

However, the noise figure in the backward-wave case is much more strongly dependent upon circuit loss than that of a forward-wave amplifier. Moreover, in the latter case, $F_{min}$ can be lowered by decreasing the value of $d$ over only the first several wave-lengths of circuit; for the backward-wave circuit, $d$ must be minimized over its entire length.

In each of the cases the curves were computed for three lengths of drift tube (0, $\frac{1}{8}\gamma_q$, $\frac{1}{4}\gamma_q$) and $\delta_0=-1$. Exactly the same values of $F_{min}$ were obtained in each case. Thus, at high gain, the noise figure is determined only by the parameters of the modulator section (if the thermal noise of the output circuit is neglected). The signal-to-noise ratio is fixed as the beam leaves the modulator. Operation at low gain levels indicate minimum noise figures slightly below those shown in Figure 11.

Referring particularly to Figures 12 and 13 we have shown a two helix backward-wave amplifier which incorporates our invention. The amplifier comprises generally an evacuated glass envelope 21. An electron gun 22, to be presently described, is disposed at one end of the envelope and a collector 23 having cooling fins 24 is disposed at the other end and serves to collect the electrons. A first helix 26 is located adjacent the gun and a second helix 27 is located adjacent the anode. A drift tube 28 is interposed between the helices. As previously described, other types of transducers may be included between the helices and serve to contribute special characteristics to the beam as it travels through the region. In certain instances, it may be possible to eliminate this region entirely and place the helices adjacent to one another.

The input signal is introduced at the collector end 29 at the first helix and is amplified as it travels towards the gun end of the tube. The amplified signal may be dissipated in a helix termination or the amplified signal may be removed. As shown, the end of the helix adjacent the gun is connected to an external coaxial line to provide for measuring the amplified signal or connection to external attenuating means. It is to be understood of course that in certain applications this end of the helix need not be brought out, but may be terminated within the tube by placing aquadag or other suitable attenuating material on the envelope or on the turns of the helix.

As previously described, when a signal is applied to the helix, a wave traveling along the helix interacts with the electron beams and tends to bunch or modulate the electron beam. The modulated electron beam then passes through the drift region 28 (although this is not essential to operation), and into a second helix or other suitable slow wave circuits which interact with the backward-wave.

The second helix may have its two ends brought out. The output signal is taken from the gun end of the second helix, with the collector end of this circuit match terminated as previously described with respect to the first helix.

In the discussion which has preceded and in the succeeding discussion, the first helix is referred to as the beam modulator (or buncher) and the second helix will be referred to as the beam de-modulator (or debuncher), since it extracts energy from the beam. It is to be understood of course that although the second helix extracts energy from the beam, it may leave the beam more bunched and spread out in velocity than before the beam enters the helix.

Generally a transition from a coaxial line to a helix introduces large standing wave ratios (reflections). It is desirable to provide a suitable tapered connection or a connection of the type shown. A ring 33 is placed about the tube and interconnects with the outside of the coaxial line. Thus, the transition is gradual from the coaxial line to the helix.

It is worth noting that in order to maintain a closer balance of the helix dimensions and to match the two sections, special precautions should be taken in forming the helices. One method which may be employed is worth mentioning. The two helices may be wound adjacent one another on a mandrel. The resulting gap between successive turns may have a wire wedged therein to form a solid cylinder around the mandrel. The helices are then fired to set the helix material. The resulting structure is extremely uniform; the pitch tolerances are very close with a small cumulative error over their length.

Construction of the envelope may also require special techniques. For example, the envelope may be constructed by shrinking glass onto a stainless steel mandrel in which three longitudinal grooves have been milled. The resulting envelope is such as shown in Figure 14, having flutes 34. The helices are then fitted snugly into the fluted envelope and are relatively free from dielectric loading.

The hollow beam electron gun shown in Figure 13 may be of the type disclosed by Pierce in "Theory and Design of Electron Beams," D. Van Nostrand Company, in 1954. Generally, the gun has a ceramic base 36 which serves to mount the grid elements 37 and 38 which are formed with annular slots 39 and 40 respectively. The cathode which may be made of nickel is also mounted on the ceramic base. A heater current is supplied along the line 42 to indirectly heat the cathode. The electrons emitted by the cathode are generally in the form of an annular beam and pass through the slot 39 into the helix region to thereby interact with the helix. The tube is enclosed within a magnetic field structure which provides a longitudinal magnetic line field which hold the electrons in a straight path to thereby give the desired cylindrical beam. This type of beam gives maximum interaction.

A cascade backward-wave amplifier of the type shown in Figures 12–14 was constructed for S-band. The tube utilized a hollow beam gun, tape helices for the backward interaction structure, and a drift space between the helix. Input and output helices were each 5½ inches long, 0.45 inch inside diameter, and had 0.125 inch pitch. The drift tube was 2½ inches long (⅛ plasma wavelength at the center of 2–4 kmc. band). All four ends of the helices were brought out to type BNC angle connectors. The hollow beam used to secure interaction with the backward wave component had a radial thickness of 0.030 inch and it was separated from the helix by approximately 0.025 inch. The measured isolation between the two helix sections was greater than 50 db.

Referring to Figure 15, the measured tuning range of the amplifier is shown. The tuning range is from 2,000 mc. to 4,000 mc. with accelerating voltage variations from 270 to 4,000 volts.

Figure 16 shows an oscilloscope comparison of the gain for the two helix tubes with that for one of the helices operating as a single helix backward-wave amplifier with the same ratio of operating to starting current. The two traces were recorded successively with the same detection system and represent power output vs. beam voltage as the tube was swept over a frequency range centered at 3,000 mc. A small gain spike was taken from the gun end of the signal launcher, and so represents the gain of the single helix backward-wave amplifier. The base line of this trace represents the average power of the signal generator. The dip to the right of the gain is a region of negative gain in which the interaction has become de-generative. Other maxima and minima of the interference pattern decrease in amplitude as one departs from synchronization with the circuit wave. The large response curve was taken from the gun end of the second helix and shows a large and very clean response for the cascaded helix amplifier. Since no direct feed-through path exists from input to output, the reference line on this trace represents essentially zero power.

Figure 17 shows measured values of gain vs. current for the tube, taken at several frequencies. Measurements were taken with bolometers located both at the output of the composite tube and at the output of the first helix. Tuning stubs were employed but were not adjusted during measurement for a particular frequency. Considerably greater apparent gain could be obtained by deliberate mismatching so as to reinforce the output signal by internal reflections. One of the theoretical curves shown for comparison is that for a single helix amplifier. This shows a much smaller gain for a given current. The other theoretical curve is the calculated curve for a two helix tube with no drift space between helices (denoted severed helix tube). The calculations previously presented indicate that the effect of the drift tube is to subtract increasingly from the over-all gain as the frequency is lowered.

Figure 18 shows gain vs. frequency for two values of normalized current. The theoretical curves (dotted) do not take into account the effect of the drift region. Close agreement between the calculated and measured values is shown, but as the calculations neglect the finite circuit loss and space charge effects, this should not be taken too literally.

Figure 19 shows the required variations in current as functions of frequency for constant gains of 20 db and 30 db. This serves to illustrate the role of the drift tube as again equalizer and the bexibility that this element lends to over-all design.

The frequency bandwidth was measured at several frequencies and gains; measured results are shown in Figure 20. The gain bandwidth product is a strongly increasing function of gain. The gain bandwidth product of a single circuit backward-wave amplifier is much less dependent upon gain and is almost constant. Thus, the bandwidth is largely fixed by the parameters of the input circuit; the increased gain bandwidth product for the cascade configuration is due to greatly increased gain for a given value of beam current.

The noise figure was measured at one point and was about 24 db. This is in the same range as for the typical forward wave traveling wave tube amplifier when no special effort is made to reduce the noise on the electron stream (e.g., by a means of velocity jumps); it is also in fair agreement with calculated noise figures assuming space charge limited flow from the cathode to the first helix and taking into account only the effect due to velocity fluctuations of the potential minimum.

The bandwidth of the cascade amplifier may be varied by stagger tuning the input and output circuits (i.e. operating them at slightly different potentials so that synchronism between the circuit wave and the beam velocity occur at slightly different frequencies in each section. Referring to Figure 21, an oscilloscope trace of a staggered tuned amplifier is shown. To obtain this curve, the input frequency was swept from 2 kmc. to 3 kmc. with a backward-wave oscillator. The traces display output power vs. frequency. With the modulator and demodulator circuits synchronized the bandwidth at 2.7 kmc. and 19 db gain was 10 mc. With a 30 volt potential difference between the helices the gain dropped to about 11 db, and the bandwidth increased to 35 mc. The response resembles that of two tuned circuits which are over-coupled. For smaller voltage differences it is possible to increase the gain bandwidth product somewhat by this method. It appears that this feature might be very useful in applications where gain is only of secondary importance and bandwidth is of primary importance.

To improve the efficiency of oscillation, the tube may be operated above start oscillation for both helices. The output signal of the second helix may be fed back to the collector end of the first helix through a phase shifter. It is then possible to greatly increase the output power of the first section. A tube of this sort may oscillate at low currents and yet give large power outputs.

Such an experiment was carried out with the above described tube and oscillations started at 4 milliamperes current. At 5 milliamperes the power output was 1 watt and the efficiency was 12%, as measured. In such a circuit the phase of the feedback signal is extremely critical.

In Figure 22 we have shown a cascade backward-wave amplifier having an electron gun 41 which projects an electron beam 42. The collector 43 serves to receive the electron beam. The periodic (slow wave) structures 44 which propagate the waves are of the zigzag waveguide type in which the axial phase velocity of the wave corresponds to the velocity of the electron beam. A transducer of the drift tube type 46 is disposed between the section **44*a* which serves as a modulator and the section 44*b*** which serves as the de-modulator.

In Figure 23 we have shown an amplifier having periodic structures 44 of the loaded waveguide type. The structures give an axial phase velocity which corresponds to the velocity of the electron beam, thereby allowing interaction between the electron beam and the backward phase. In Figure 24, another amplifier is shown in which the periodic structure is of the loaded waveguide type.

It is to be understood of course that the periodic structures which have been illustrated and described are illustrative only. Any periodic structure capable of propagating the wave with the proper axial phase velocity will be suitable for use in the cascade backward-wave amplifier. Further, one type of structure may be used in the modulator section and a different type of structure in the de-modulator section. Thus it is seen that the invention is not limited to particular periodic structures, but that structures capable of modulating and demodulating the beam are within the spirit and scope of this invention.

Referring to Figure 25, we have shown a backward-wave amplifier in which the electron beam 51 is modulated in the gun 52 by the grid 53. The modulated wave then interacts with a periodic structure which, for example, may be a helix 54. The periodic structure serves to de-modulate the beam and provide an amplified output at the gun end of the structure.

In Figure 26, a cascade backward-wave amplifier having an electron gun 56 which projects an electron beam 57 to the collector 58 is shown. The beam is modulated by means of the cavity 59 and travels through a drift region 61. A periodic structure, shown as a helix 62, interacts with the electron beam and serves to de-modulate the beam and provide an amplified output at the gun end of the periodic structure.

In Figure 27 we have shown an amplifier similar to that of Figure 26 in which the cavity is placed adjacent the collector end and the periodic structure adjacent the gun end. Thus the periodic structure serves as the modulator and the cavity as the de-modulator.

Operation of the amplifiers shown in Figures 25 through 27 is similar to that previously described. That is, the beam is modulated, and a structure interacts with the modulated beam to thereby de-modulate the beam. The kinetic energy of the beam is reduced and an amplified output results.

From the foregoing, it is seen that we have provided a greatly improved backward-wave traveling-wave amplifier tube. In the cascade amplifier described, a relatively high gain is achieved with operating currents which are far below the start oscillation current. The slope of the gain-current curve is also much smaller for a given gain, so that stable operation is possible over the entire frequency band. Another advantage of the cascade amplifier which we have described lies in the freedom to terminate one end of each section in an internal reflectionless match. With tapered terminations placed on the circuit, the operating characteristics may be made to vary smoothly with frequency, and the amplifier may be designed for almost constant gain over a large frequency range.

In a single helix backward-wave tube the input and output terminals are connected through the helix. In the cascade traveling-wave tube, a break is made between the input and output terminals, that is, the helix is severed. Only a narrow band of frequencies whose corresponding backward-wave phase velocities are in approximate synchronism with the beam velocity can be coupled onto the output circuit; other signals are simply dissipated in the lossy terminations of the input circuit. The off-signal rejection of the cascade amplifier is therefore very high, whereas a single circuit backward amplifier provides a direct feedthrough path which must be broken artificially if adequate cold loss is to be introduced. A further advantage with the cascade amplifier described is the possibility of altering bandwidth by stagger-tuning the sections. This results in a filter whose center frequency and bandwidth may be varied electronically.

We claim:

1. A backward wave amplifier comprising an electron gun serving to project an electron beam, a collector spaced from said gun and serving to receive said beam, modulating means serving to receive an input electromagnetic wave and disposed whereby said wave interacts with the beam to modulate the same, second means serving to support an output wave disposed whereby the wave interacts with the modulated beam to extract energy therefrom and produce an amplified output wave at the gun end of the same, said second means comprising a periodic structure serving to support a backward travelling wave with the maximum fields occurring near the electron gun end so that the modulated beam initially interacts with maximum fields after leaving the modulating means.

2. A backward wave amplifier comprising an electron gun serving to project an electron beam, a collector spaced from said gun and serving to receive said beam, a first periodic structure adapted to propagate a backward electromagnetic wave corresponding to an input signal, said structure disposed whereby the fields of the propagated wave interact with the electron beam to modulate the beam in accordance therewith, and a second periodic structure adapted to propagate an output backward electromagnetic wave corresponding to the input signal, said wave having maximum fields near the gun end of said second structure, said second structure being spaced along the beam from said first structure and disposed whereby the fields of the propagated output wave interact with the beam to extract energy therefrom, said modulated beam initially interacting with the output electromagnetic wave in a region of maximum field whereby to provide an enhanced interaction between the wave and beam.

3. Apparatus as in claim 2 wherein said first and second periodic structures comprise slow-wave structures.

4. Apparatus as in claim 2 wherein said first and second periodic structures comprise helices.

5. A backward wave amplifier comprising an electron gun serving to project an electron beam, a collector spaced from said gun and adapted to intercept said beam, a first periodic structure adapted to propagate a backward electromagnetic wave corresponding to an input signal, said structure disposed whereby the fields of the propagated wave interact with the electron beam to modulate the beam in accordance therewith, input means located at the collector end of said first structure whereby an input signal may be applied thereto, a second periodic structure adapted to support a backward wave which interacts with the modulated beam to extract energy therefrom, the maximum fields on said second periodic structure being at the gun end of the structure, said second structure being spaced along the beam from said first structure and disposed whereby the fields of the propagated wave interact with the beam to extract energy therefrom, said modulated beam initially interacting with the output electromagnetic wave in a region of maximum field whereby to provide an enhanced interaction, and terminating means associated with the collector end of said second structure.

6. Apparatus as in claim 5 wherein said first and second periodic structures comprise helices.

7. A backward wave amplifier comprising an electron gun serving to project an electron beam, a collector spaced from said gun and serving to intercept said beam, a first periodic structure located at the gun end of said beam and serving to propagate a backward wave corresponding to an input signal, input means located at the collector end of said structure and adapted to receive an input signal and apply the same to the periodic structure, terminating means associated with the gun end of said structure and serving to attenuate energy travelling along said first structure, a second periodic structure serving to support an output backward wave disposed whereby the wave carried by the structure interacts with the modulated beam to extract energy therefrom, the maximum fields on said second periodic structure occurring at the gun end of the structure, said modulated beam initially interacting with the output electromagnetic wave in a region of maximum field whereby to provide enhanced interaction, output means associated with the gun end of said second periodic structure for coupling off the amplified signal from the structure, and terminating means located at the collector end of the structure and serving to attenuate incident energy.

8. Apparatus as in claim 7 wherein said periodic structures comprise cascaded helices.

9. Apparatus as in claim 7 wherein said periodic structures comprise zigzag waveguides.

10. Apparatus as in claim 7 wherein said periodic structures comprise loaded waveguides.

11. A backward-wave amplifier comprising an electron gun serving to project an electron beam, a collector spaced from said gun and intercepting said beam, a first periodic structure which propagates a backward wave corresponding to an input signal disposed whereby the wave interacts with said beam to modulate the electron beam in accordance with said signal, a second periodic structure serving to support a second backward wave which interacts with the modulated beam to extract energy therefrom, said wave having frequency characteristics corresponding to the beam modulation and having its maximum field at the gun end of said second periodic structure, said modulated beam initially interacting with the second wave in the region of its maximum field whereby to provide enhanced interaction, and transducing means disposed between said periodic structures.

12. Apparatus as in claim 11 wherein the transducing means comprises a drift tube.

13. Apparatus as in claim 11 wherein the periodic structures comprise first and second helices and wherein the transducing means comprises at least one floating helix.

14. Apparatus as in claim 11 wherein said transducing means comprises a small separation between said periodic structures.

15. A backward-wave amplifier comprising an electron gun serving to project an electron beam, a collector spaced from said gun and serving to intercept said beam, a first periodic structure which propagates the input signal disposed whereby the fields of the propagated signal interact with said beam to thereby modulate the beam in accordance with the signal, input means associated with the collector end of said structure, terminating means associated with the gun end of said structure, a second periodic structure adapted to propagate an output signal as a backward wave, the maximum fields on said structure occurring at the gun end of said second periodic structure, said structure disposed along the beam whereby the fields of the signal carried by the same interact with the modulated beam to provide an amplified signal corresponding to the input signal, said beam interacting initially with the maximum fields, output means associated with the gun end of said structure, and terminating means associated with the collector end and serving to attenuate energy traveling towards the collector.

16. Apparatus as in claim 15 wherein the said first and second periodic structures comprise helices.

17. Apparatus as in claim 15 wherein the said structures are operated at different potentials whereby the bandwidth of the amplifier may be controlled.

18. Apparatus as in claim 15 wherein the periodic structures have different lengths whereby the bandwidth of said amplifier may be controlled.

19. A backward-wave amplifier comprising an electron gun, a hollow electron beam projected by said gun, a collector disposed to receive said beam, a first helical structure having its axis coincident with the axis of the beam and serving to propagate an input wave to thereby modulate the electron beam in accordance with said input wave, input means associated with the collector end of said structure and providing means for applying the input signal to the structure, a second helical structure in cascade with said first structure and having its axis coincident with the axis of the beam, said structure serving to propagate the output signal with the maximum fields occurring at the gun end so that the modulated beam from the first section initially interacts with maximum fields, output means associated with the gun end of said structure to thereby provide means for removing the output signal from said structure, terminating means associated with the collector end of said helical structure to thereby attenuate energy traveling toward the collector end, and transducing means interposed between said first and second structure.

20. A backward-wave amplifier as in claim 1 wherein said modulating means comprises a cavity.

21. A backward-wave amplifier as in claim 1 wherein said modulating means comprises a grid.

References Cited in the file of this patent

UNITED STATES PATENTS

| | | |
|---|---|---|
| 2,367,295 | Llewellyn | Jan. 16, 1945 |
| 2,616,990 | Knol | Nov. 4, 1952 |
| 2,637,001 | Pierce | Apr. 28, 1953 |
| 2,653,270 | Kompfner | Sept. 22, 1953 |
| 2,681,951 | Warnecke et al. | June 22, 1954 |
| 2,753,481 | Ettenberg | July 3, 1956 |
| 2,802,136 | Lindenblad | Aug. 6, 1957 |
| 2,814,756 | Kenmoku | Nov. 26, 1957 |
| 2,824,256 | Pierce et al. | Feb. 18, 1958 |
| 2,840,752 | Cutler et al. | June 24, 1958 |

FOREIGN PATENTS

| | | |
|---|---|---|
| 651,516 | Great Britain | Apr. 4, 1951 |
| 699,893 | Great Britain | Nov. 18, 1953 |
| 1,080,027 | France | May 26, 1954 |